(12) United States Patent
Myers et al.

(10) Patent No.: US 8,017,539 B2
(45) Date of Patent: Sep. 13, 2011

(54) ONCE THROUGH REGENERATION FOR AN OLEFIN CRACKING REACTOR

(75) Inventors: Daniel N. Myers, Arlington Heights, IL (US); Adam J. Kanyuh, Streamwood, IL (US); Richard A. Johnson, II, Algonquin, IL (US); Nitin P. Chitgopekar, Hoffman Estates, IL (US)

(73) Assignee: UOP LLC, Des Plaines, IL (US)

( * ) Notice: Subject to any disclaimer, the term of this patent is extended or adjusted under 35 U.S.C. 154(b) by 525 days.

(21) Appl. No.: 12/256,127

(22) Filed: Oct. 22, 2008

(65) Prior Publication Data

US 2010/0099549 A1    Apr. 22, 2010

(51) Int. Cl.
*B01J 38/12* (2006.01)
(52) U.S. Cl. .............................. 502/38; 502/39; 502/514
(58) Field of Classification Search .................... 502/34, 502/38, 39, 50, 56, 514, 518
See application file for complete search history.

(56) References Cited

U.S. PATENT DOCUMENTS

| | | | |
|---|---|---|---|
| 4,980,325 A | 12/1990 | Sechrist | |
| 5,001,095 A | 3/1991 | Sechrist | |
| 5,008,412 A | 4/1991 | Ramachandran et al. | |
| 5,180,570 A | 1/1993 | Lee et al. | |
| 5,392,594 A | 2/1995 | Moore et al. | |
| 5,457,077 A | 10/1995 | Williamson et al. | |
| 5,565,089 A * | 10/1996 | Ramachandran et al. | 208/113 |
| 6,048,508 A | 4/2000 | Dummersdorf et al. | |
| 6,117,916 A | 9/2000 | Allam et al. | |
| 6,869,978 B2 | 3/2005 | Wright et al. | |
| 6,878,655 B2 | 4/2005 | Raje et al. | |
| 6,962,947 B2 | 11/2005 | Wright et al. | |
| 2005/0234278 A1 | 10/2005 | Van Egmond et al. | |
| 2007/0129587 A1 | 6/2007 | Iaccino et al. | |
| 2007/0276171 A9 | 11/2007 | Iaccino et al. | |
| 2008/0078294 A1 | 4/2008 | Adamopoulos | |
| 2008/0142409 A1 | 6/2008 | Sankaranarayanan et al. | |

* cited by examiner

*Primary Examiner* — Edward Johnson
(74) *Attorney, Agent, or Firm* — Arthur E Gooding

(57) ABSTRACT

A regeneration process for olefin cracking reactor is presented. The process utilizes the nitrogen waste stream from an air separation plant and the partially combusted effluent stream from the olefin cracking reactor is used to heat the nitrogen waste stream. The control of the heating of the nitrogen waste stream can be achieved through redirection of a portion of the heat from combustion to generate steam.

19 Claims, 2 Drawing Sheets

ONCE THROUGH REGENERATION FOR AN OLEFIN CRACKING REACTOR

FIELD OF THE INVENTION

This invention relates to the regeneration of catalyst. In particular, the regeneration of an olefin cracking catalyst where the catalyst is a fixed bed and remains in the reactor.

BACKGROUND OF THE INVENTION

Swing reactor systems are used in the hydrocarbon processing industry for processes that entail the frequent regeneration of catalyst. This is true for fixed bed reactors, where the catalyst is regenerated in situ, and the process is swung over to a second, or third, reactor, while the catalyst in the first reactor is regenerated. A typical regeneration involves removing the coke deposits that accumulate over the time the reactor is on stream. One process is the Olefin Cracking Process (OCP) where C4-C8 olefins are passed over a catalyst bed and crack to smaller molecules. The cracking process generates some coking on the catalyst, and over time the catalyst activity is reduced due to plugging of the catalyst pores with coke. The catalyst is regenerated though oxidizing the coke and removing it as gas comprising $N_2$, $H_2O$, CO and $CO_2$. The OCP reactors are regenerated every 48 hours, and therefore the process is swinging between the reactors on a frequent basis.

It is important to provide a simple, reliable regeneration system which burns off coke deposits in a mostly nitrogen environment—utilizing a minimum capital cost, minimum complexity arrangement.

SUMMARY OF THE INVENTION

The present invention comprises utilizing the nitrogen stream generated by an air separation plant for use in regeneration of a catalyst bed. The air separation plant which is primarily used to produce an oxygen rich stream also generates a large nitrogen stream as a waste, which is an ideal candidate for use as a regeneration gas stream. The nitrogen stream is mixed with air to bring the oxygen level up to less than 1 mole %, thereby creating a nitrogen rich (oxygen lean) stream. The nitrogen rich stream is heated to a temperature level in the range of the normal operating temperature for the catalyst bed. The heated nitrogen rich stream partially oxidizes carbon and organic residue on the catalyst and generates an effluent stream containing carbon monoxide, nitrogen, water and carbon dioxide. The oxygen level is restricted to limit the combustion of carbon and organic residue and therefore the temperature rise in the catalyst bed during regeneration. The effluent stream is passed to a combustion chamber, where the carbon monoxide is combusted before release to the atmosphere, or routing to other purposes. The combustion chamber is used to heat the effluent stream to the desired temperature for the conversion of carbon monoxide to carbon dioxide. Control of the heat from the combustion chamber to prevent overheating of the nitrogen rich stream is facilitated through redirection of a portion of the hot gases in the combustion chamber to generate steam. The amount of heat to the nitrogen rich (oxygen lean) stream can be controlled through monitoring the temperature and using feedback to the combustion chamber.

Other objects, advantages and applications of the present invention will become apparent to those skilled in the art from the following detailed description and drawings.

DETAILED DESCRIPTION OF THE INVENTION

Figure 1:
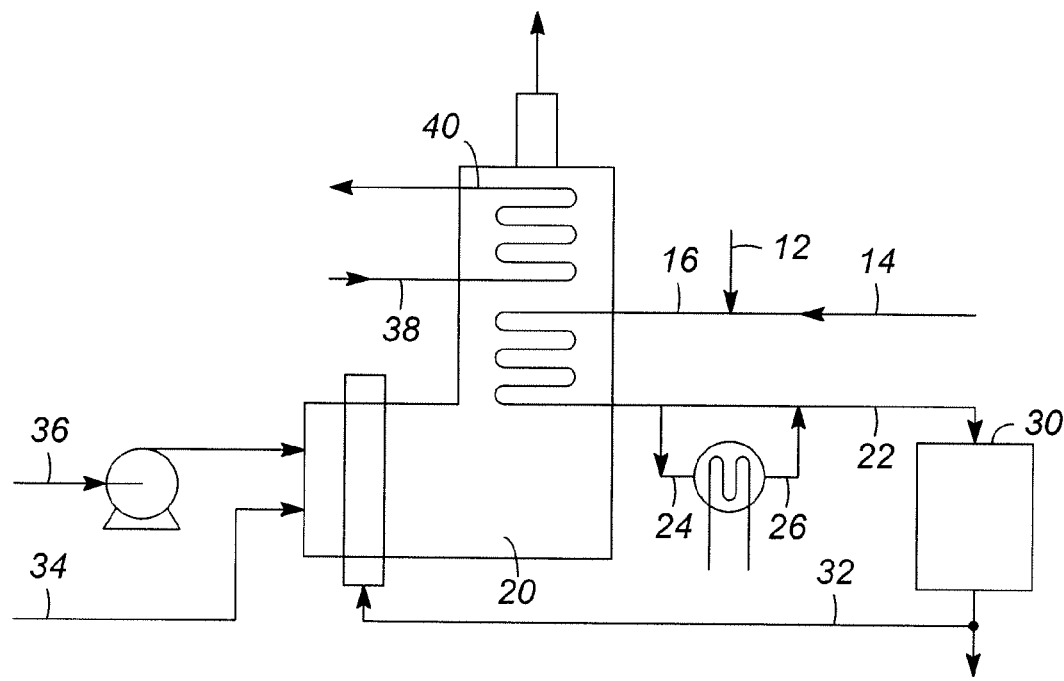
FIG. 1 is a diagram of the process using series convention banks for the heating of nitrogen and generating steam.

Special opportunities for regeneration equipment simplification and capital cost reduction exist when an Olefin Cracking Process (OCP) unit is part of an Olefin Complex which contains a Natural Gas to Methanol Process and a Methanol to Olefins (MTO) process.

The process for regeneration of catalyst used in the olefin cracking process comprises running a heated nitrogen rich (oxygen lean) gas over the catalyst to burn off the carbon and residual organics deposited on the catalyst. The process comprises heating the regeneration gas to the temperature of the reactor to minimize thermal shocks to the catalyst system, and to provide the heat necessary for the combustion of carbon and residual organics. A large amount of inert gas is used to control the exothermic reaction generated during the coke burn, and typically, the gas is recycled where the spent gas is cooled, dried, and recycled. This is an expensive procedure, but with the accompaniment of a methanol to olefins process, or other process utilizing a large amount of oxygen (and consequently a large amount of nitrogen is available), the process can be simplified and significant savings can result with the once through nitrogen approach.

The olefin cracking process can be run between 24 and 72 hours before the catalyst needs regeneration, but uses two reactors in a 48 hours cycle. One is kept on-stream and one is in regeneration mode. After 48 hours, the reactors are switched. The regeneration uses a gas stream having a nitrogen rich (oxygen lean) content. The lean oxygen stream is a nitrogen stream, or other inert gas, where the amount of oxygen is below that found in air. The regeneration gas preferably has an oxygen content between 0.4 and 5.0 mole %, and is preferably a dry gas, where the moisture content, i.e. water content, is less than 100 ppm. It is preferred that the water content be less than 10 ppm, and more preferred that the water content be less than 1 ppm. The low water content is to protect the catalyst during the regeneration stage. The operation of an OCP reactor is at a temperature from 500° C. to 600° C., and preferably between 525° C. to 585° C. The pressure for the OCP reactor during operation is between 10 kPa to 200 kPa, with a preferred operating pressure between 60 kPa to 100 kPa for the olefin partial pressure. The flow conditions are a GHSV from 2000 to 3000 $hr^{-1}$, with a preferred GHSV from 2400 to 2600 $hr^{-1}$.

For regeneration, it is preferred to keep the temperature and pressure of the reactor relatively stable, and therefore regeneration conditions of temperature and pressure will be close to the operational temperatures and pressures of the OCP reactor.

The amount of oxygen is kept low to control the rise in temperature due to the partial combustion of carbon and residual organics, and to protect the catalyst by limiting the amount of temperature rise during the regeneration process.

The use of nitrogen for a once through process allows the elimination of expensive equipment such as a high temperature feed and effluent heat exchanger, a reactor effluent cooler, a compressor suction drum, a recycle compressor, and recycle dryers. This also eliminates the steps of cooling the effluent gas, cleaning the effluent gas, including drying the gas, and recompressing the gas, thereby simplifying the process.

The methanol plant requires a lot of oxygen, and this includes an air separation plant to extract the oxygen from the air. As a waste product of the air separation process, a large quantity of nitrogen is generated. The waste nitrogen from the oxygen plant can be used for regeneration of the OCP catalyst, instead of venting the nitrogen to the atmosphere. This combination can be coupled with any process that requires an air separation plant and generates a large quantity of nitrogen as a waste gas. The nitrogen does not have to be purified to the extent that the oxygen is purified for the methanol plant. The nitrogen can contain some oxygen for use in the regeneration process, and any oxygen present will reduce the need to add a relatively small amount of air needed to be injected into the nitrogen before heating the nitrogen stream.

The present invention is a process for the regeneration of a swing reactor used in the olefin cracking process, and one embodiment is shown in FIG. 1. The process comprises adding air through an air line 12 to a nitrogen stream in a nitrogen stream line 14, thereby generating a nitrogen rich (oxygen lean) stream 16. The nitrogen rich (oxygen lean) stream 16 is a stream having a lean oxygen content, where the term lean is used to indicate that the oxygen content is less than that of air, and that when the oxygen is used to oxide carbon and residual organic compounds, the amount is less than stoichiometrically needed for complete combustion. The amount of oxygen is kept low to control the rise in temperature by limiting the rate of combustion, and to protect the catalyst by limiting the amount of temperature rise during the regeneration process. The nitrogen rich (oxygen lean) stream 16 is heated in a combustion chamber 20 to a regeneration temperature, thereby generating a heated nitrogen rich (oxygen lean) stream 22. The nitrogen rich stream is heated to a temperature close to the operating temperature of an olefin cracking reactor 30. The regeneration temperature is chosen to be approximately the same temperature as the cracking reactor 30 operating temperature to reduce thermal shocks, and to reduce or eliminate time needed for heating up the reactor 30 and for cooling down the reactor 30. Therefore, the regeneration is operated to maintain the reactor 30 at a steady elevated operating temperature. The heated nitrogen rich (oxygen lean) stream 22 is passed to the olefin cracking reactor 30, where the heated gas provides sufficient heat to oxidize carbon and residual organics off the catalyst within the reactor 30. The combustion of carbon and residual organics generates an effluent stream 32 comprising nitrogen, carbon monoxide, water and carbon dioxide. The effluent stream 32 is passed to the combustion chamber 20, where the combustion chamber 20 is operated at a combustion temperature sufficient to convert the carbon monoxide (CO) to carbon dioxide ($CO_2$).

The partial combustion of carbon and residual organics, through the control of the amount of oxygen in the nitrogen rich (oxygen lean) stream, allows control of the combustion process and prevents overheating of the reactor and catalyst during the regeneration. When the regeneration is complete, and there is no more combustion, the amount of oxygen in the nitrogen rich stream 16 is increased to about 5 mole %. The temperature of the effluent stream 32 is monitored and as a check on the completeness of the regeneration. If the temperature rises, there is residual carbon and combustion is not yet complete.

The nitrogen stream 14 can come from any source, but in the case of an air separation plant, it generates a substantial nitrogen waste stream. Instead of venting the nitrogen to the atmosphere, and thereby wasting the energy expended in the separation process, the nitrogen can be utilized in conjunction with the olefin cracking process for the regeneration process. An advantage for the once through process of nitrogen regeneration is the savings due to less equipment. There are no exchangers, compressors, or driers that are needed for a system that recycles the nitrogen gas stream to regenerate the catalyst.

The nitrogen stream 14 for use in this process can arrive at a pressure between 100 kPa and 700 kPa (14.5 psia to 102 psia). More typically, the pressure is between 250 kPa and 700 kPa (36 psia to 102 psia). The pressure for the nitrogen rich stream 16 needs sufficient pressure to pass through the system to the combustion chamber 20, and typically does not require compression. Operating pressure for the nitrogen rich stream 22 can be between 100 kPa and 150 kPa (14.5 psia to 22 psia), and preferably be between 115 kPa and 120 kPa (16.7 psia to 17.5 psia). In general, the air separation plant will deliver a nitrogen stream 14 at a pressure sufficient for this process. If the nitrogen stream 14 is delivered at a high pressure level, the pressure can be reduced by a pressure reducing valve, or can be used to generate energy, such as electricity through a turbine, in the process of reducing the pressure.

The combustion chamber 20 is usually supplemented with a fuel gas 34 and supplemental combustion air 36 to maintain the combustion chamber 20 at a high temperature. The combustion chamber 20 is operated at a temperature between 800° C. and 1100° C. (1470° F. to 2000° F.), and preferably between 870° C. and 980° C. (1600° F. to 1800° F.). The temperature for the regeneration of the cracking reactor 30 is between 500° C. and 700° C. (930° F. to 1300° F.), and preferably between 530° C. and 600° C. (985° F. to 1100° F.), and more preferably between 530° C. and 595° C. (985° F. to 1100° F.). Heating the nitrogen rich (oxygen lean) stream above 700° C. can potentially harm the catalyst during the regeneration process. The amount of heat directed to heating the nitrogen rich stream 16 can be controlled by generating steam with excess heat generated during the heating process. An additional stream 38 is used to generate steam in steam generating coil 40 located at the top leaving the combustion chamber 20 provides for additional energy recovery.

The combustion chamber 20 flow of hot gases can become large for the amount of nitrogen to be heated. The control of heating the nitrogen rich stream 16 can be facilitated through feedback using the combustion chamber 20 temperature.

Further control over the heating of the nitrogen rich stream 16 can be facilitated by passing a portion 24 of the heated stream 22 through a heat exchanger 26 for the generation of additional steam.

In one embodiment, the combustion chamber 20 is a thermal oxidizer, and is operated at a high temperature, between 800° C. and 1100° C.

Figure 2:
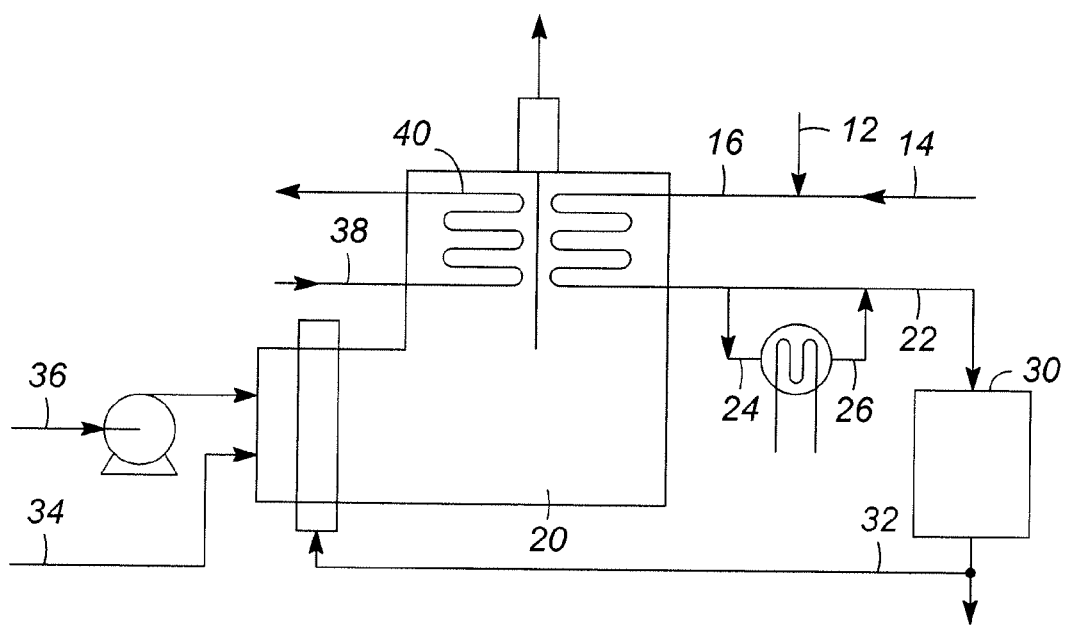
FIG. 2 is a diagram of the process using parallel convention banks for the heating of nitrogen and generating steam.

An alternate embodiment is shown in FIG. 2. In this embodiment, air admitted through an air line 12 is mixed with nitrogen in a nitrogen line 14 to form a nitrogen rich stream 16. The nitrogen rich (oxygen lean) stream is heated in a combustion chamber 20 to a temperature near the operating temperature of an olefin cracking reactor 30, thereby generating a heated nitrogen rich (oxygen lean) stream 22. The heated nitrogen rich (oxygen lean) stream 22 is passed to the off-line reactor 30, where the heated nitrogen rich stream, having a lean oxygen content, oxidizes carbon and residual organics that have accumulated on the catalyst, and generates an effluent stream 32. The effluent stream 32 is passed to a combustion chamber 20 having parallel convection banks. The parallel convection banks provide control over the heating of the nitrogen rich stream 16 through diversion of a portion of the hot gas from the combustion chamber 20. The hot gas is split into two streams with a first stream is used to heat the nitrogen rich stream 16 and a second stream is used to generate steam in a steam generating coil 40.

The control of diversion of a portion of hot gas in the combustion chamber 20 can be controlled through feedback from the heating of the nitrogen rich stream 16. If the temperature of the nitrogen rich stream 16 exceeds an upper preset temperature level, such as for example 600° C. for an upper temperature level for catalyst regeneration, when leaving the combustion chamber 20, more of the hot gas can be diverted to steam generation. If the temperature of the nitrogen rich (oxygen lean) stream 16 drops below a lower preset temperature level, such as for example 500° C. for a lower temperature level for catalyst regeneration, when leaving the combustion chamber 20, more of the hot gas can be directed to heat the nitrogen rich (oxygen lean) stream 16 as it passes through the combustion chamber 20.

Figure 3:
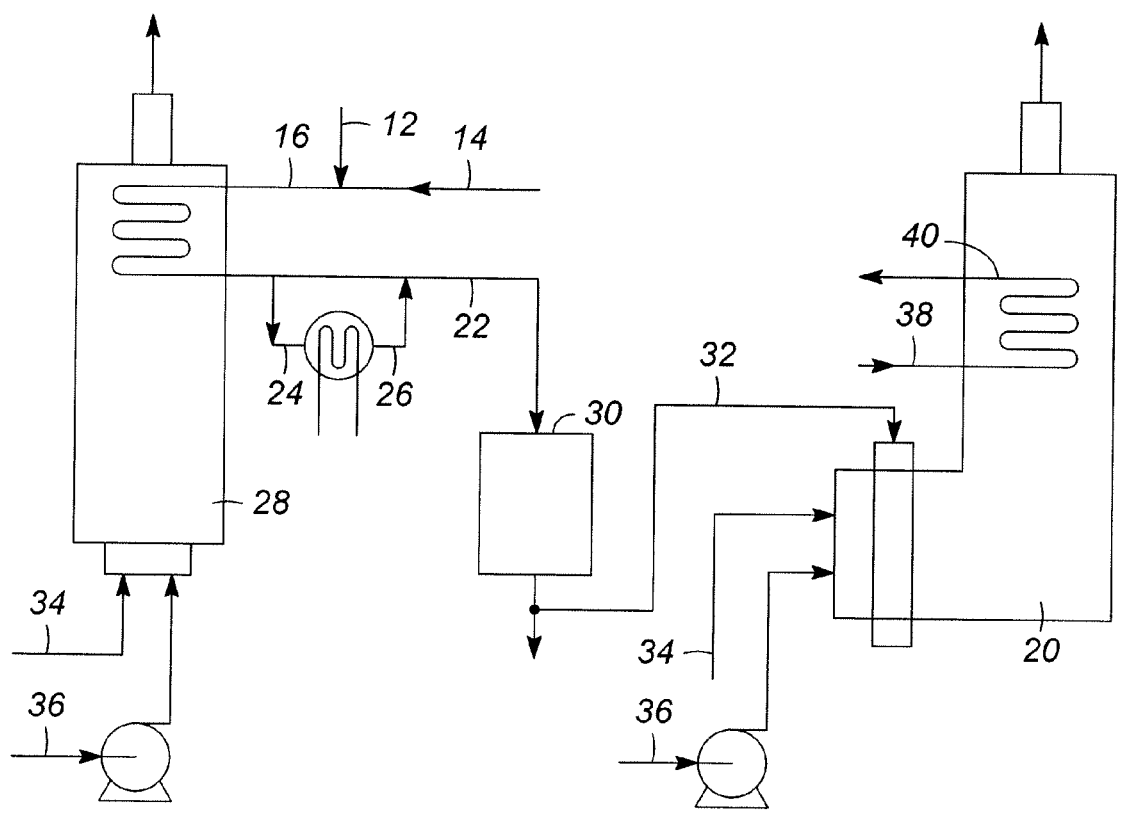
FIG. 3 is a diagram of the process using a regeneration heater and a separate combustion chamber.

In a third embodiment, the once through heating of a nitrogen rich stream 16 is presented in FIG. 3. A nitrogen stream 14 is mixed with an air stream 12 and passed to a regeneration heater 28, where the nitrogen rich stream 16 is heated to the regeneration temperature. The regeneration heater 28 is heated by combustion of fuel gas 34 and air 36. The heated nitrogen rich (oxygen lean) stream 22 is passed to the olefin cracking reactor 30 where partial oxidation of carbon and residual organics are oxidized and removed from the catalyst. An effluent stream 32 is generated and passed to a combustion chamber 20, where the carbon monoxide in the effluent stream undergoes complete oxidation. The combustion chamber 20 can be used to generate steam 40.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. A process for regeneration of a swing reactor comprising:
adding air to a nitrogen stream, thereby generating a nitrogen rich stream;
heating the nitrogen rich stream to a regeneration temperature, thereby generating a heated nitrogen rich stream;
passing the heated nitrogen rich stream to an olefin cracking reactor, wherein the temperature is sufficient to burn carbon off of catalyst in the olefin cracking reactor, thereby generating an effluent stream comprising nitrogen, carbon monoxide, water and carbon dioxide; and
passing the effluent stream to a combustion chamber operated at a combustion temperature to convert CO to $CO_2$.

2. The process of claim 1 wherein the nitrogen rich stream is heated in the combustion chamber.

3. The process of claim 1 further comprising generating steam in the combustion chamber.

4. The process of claim 3 wherein the combustion chamber has parallel convection banks for heating the nitrogen rich stream and generating steam.

5. The process of claim 1 further comprising passing supplemental fuel and combustion air to the combustion chamber.

6. The process of claim 1 wherein the combustion chamber is a thermal oxidizer.

7. The process of claim 1 wherein the nitrogen stream is generated by an air separation plant.

8. The process of claim 1 wherein the combustion temperature is between 800° C. and 1100° C.

9. The process of claim 8 wherein the combustion temperature is between 870° C. and 980° C.

10. The process of claim 1 wherein the nitrogen rich stream upstream of the reactor is at a regeneration pressure is between 100 kPa and 700 kPa.

11. The process of claim 10 wherein the nitrogen rich stream upstream of the reactor is at a regeneration pressure is between 100 kPa and 150 kPa.

12. The process of claim 11 wherein the pressure upstream of the reactor is between 115 kPa and 120 kPa.

13. The process of claim 1 wherein the oxygen in the nitrogen rich stream is below the stoichiometric amount for complete combustion of residual carbon and hydrocarbons in the olefin cracking reactor.

14. The process of claim 1 wherein the regeneration temperature is between 500° C. and 700° C.

15. The process of claim 14 wherein the regeneration temperature is between 530° C. and 600° C.

16. The process of claim 15 wherein the regeneration temperature is between 530° C. and 595° C.

17. A process for regeneration of a swing reactor comprising:
adding air to a nitrogen stream generated from an air separation plant at a pressure between 100 kPa and 700 kPa, thereby generating a nitrogen rich stream;
heating the nitrogen rich stream to a regeneration temperature between 500° C. and 600° C., thereby generating a heated nitrogen rich stream;
passing the heated nitrogen rich stream to an olefin cracking reactor, wherein the temperature is sufficient to burn carbon off of catalyst in the olefin cracking reactor, thereby generating an effluent stream comprising carbon monoxide, nitrogen, water and carbon dioxide;
generating steam in the combustion chamber; and
passing the effluent stream to the combustion chamber operated at a combustion temperature between 800° C. and 1100° C., to oxidize the carbon monoxide.

18. The process of claim 17 wherein the air is added at a pressure upstream of the reactor is between 100 kPa and 150 kPa.

19. The process of claim 17 wherein the nitrogen rich stream is heated to a temperature between 530° C. and 600° C.

* * * * *